April 10, 1962 H. D. DIRKS 3,028,905
SHAFT STRAIGHTENING MACHINE
Filed March 1, 1960 2 Sheets-Sheet 1
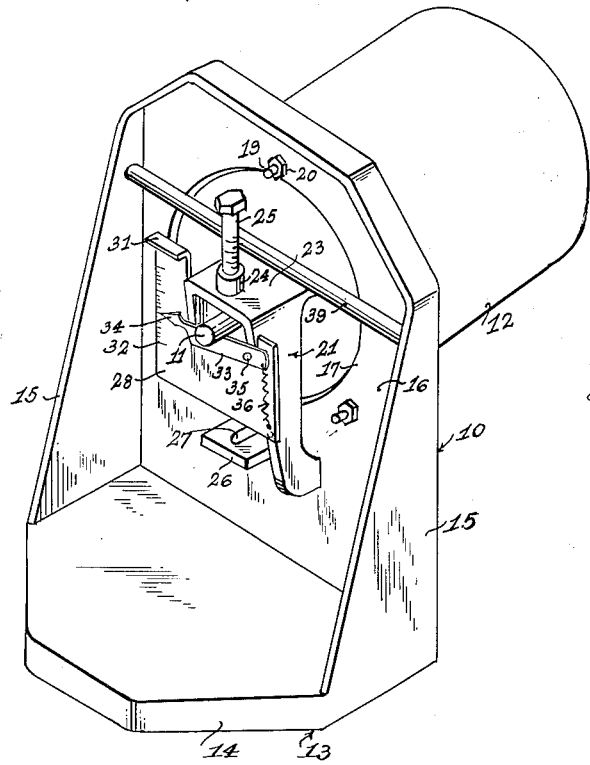
Fig. 1.
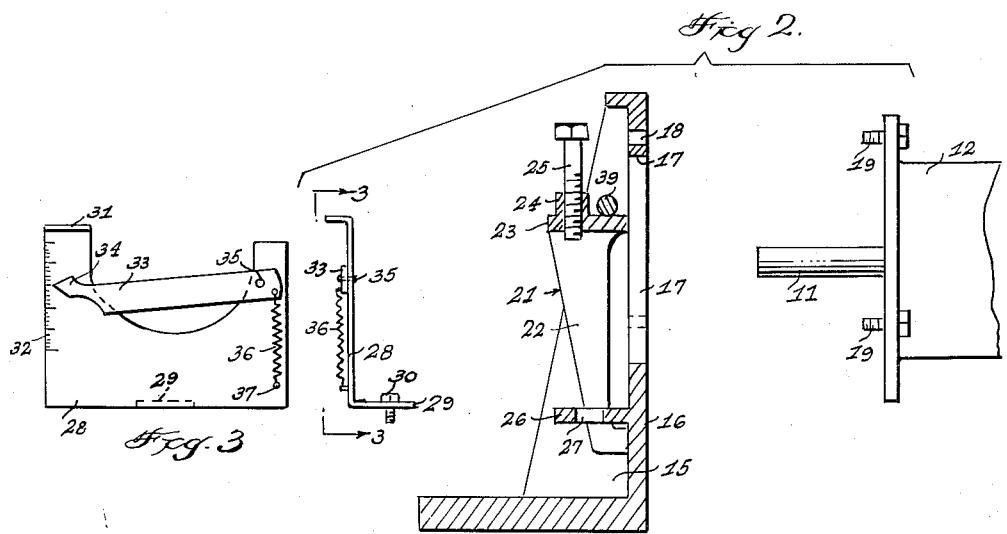
Fig. 2.
Fig. 3.
INVENTOR.
HENRY D. DIRKS
BY
Victor J Evans &Co,
ATTORNEYS April 10, 1962   H. D. DIRKS   3,028,905
SHAFT STRAIGHTENING MACHINE
Filed March 1, 1960   2 Sheets-Sheet 2

INVENTOR.
HENRY D. DIRKS
BY
Victor J. Evans & Co.
ATTORNEYS 3,028,905
SHAFT STRAIGHTENING MACHINE
Henry D. Dirks, 102 Park Place, Anamosa, Iowa
Filed Mar. 1, 1960, Ser. No. 12,210
2 Claims. (Cl. 153—53)

This invention relates to a machine for use in straightening shafts of engines.

The object of the invention is to provide a machine or apparatus which is especially suitable for use in straightening shafts such as bent crankshafts, and wherein when using the machine of the present invention it is not necessary to remove the shaft from the engine on most vertical crankshaft engines.

Another object of the invention is to provide a machine which is especially suitable for use in straightening shafts such as shafts of two and four cycle engines, the machine serving to accommodate engines of different capacity or size so that the engine crankshaft can be returned to tolerable limit so that the machine can be readily placed back in service after the shaft has been straightened.

A further object of the invention is to provide a shaft straightening machine which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a perspective view illustrating the shaft straightening machine of the present invention.

FIGURE 2 is a view showing the parts disassembled and with parts broken away and in section.

FIGURE 3 is a view taken on the line 3—3 of FIGURE 2.

Figure 4:
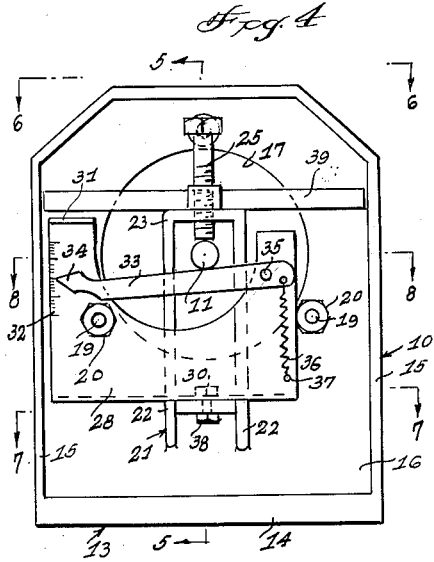
FIGURE 4 is a front elevational view of the machine.

Referring in detail to the drawings, the numeral 10 indicates the shaft straightening machine of the present invention which is adapted to be used for straightening a shaft such as the shaft 11 of an engine 12. The engine 12 is of conventional construction and is not part of the present invention, and the shaft 11 is operatively connected to the engine 12 in the usual manner and with sufficient rigidity so as to prevent damage to the engine 12 during the straightening of the shaft 11.

According to the present invention there is provided a stand or frame 13 which includes a horizontally disposed base 14 as well as upstanding side portions 15 and a vertically disposed wall member 16. The wall member 16 is provided with an enlarged circular opening 17, and there is also provided in the wall member 16 a plurality of spaced apart apertures 18 whereby securing elements such as bolts 19 from the engine 12 can extend through the apertures 18, and nuts 20 are adapted to be arranged in threaded engagement with the bolts 19 in order to maintain the engine 12 fastened to the wall member 16.

The numeral 21 indicates a support member which includes a pair of vertically disposed spaced parallel legs 22 that have their lower ends fastened to the wall member 16 in any suitable manner, as for example by welding, and a horizontally disposed cross piece 23 extends between the upper ends of the legs 22. A bushing 24 is fastened to the upper surface of the cross piece 23, and the numeral 25 indicates a screw member or bolt which extends through the bushing 24 and through the cross piece 23, as for example as shown in FIGURE 2.

Extending from the wall member 16 and secured thereto or formed integral therewith is a horizontally disposed guide bar 26 which is provided with a slot 27 therein. The numeral 28 indicates a plate which has on its lower portion a flange 29, and a securing element 30 extends through the flange 29 and through the slot 27, and a suitable nut 38 is adapted to be arranged in threaded engagement with the lower end of the bolt 30, FIGURE 4. The plate 28 is also provided with a shoulder or stop member 31 on its upper end, FIGURE 3, and there is provided on the plate 28 scale markings or indicia 32. The numeral 33 indicates an indicator which has a pointed end 34 for coaction with the scale markings 32, and the indicator 33 is pivotally connected to the plate 28 by means of a pivot pin 35, there being a spring member 36 which has one end connected to the indicator 33, while the lower end or other end of the spring member 36 is anchored as at 37 to the plate 28.

The numeral 39 indicates a rod which is fastened to the member 23 and the ends of the rod 39 float between the portions 15, and the function of the rod 39 is to prevent the member 25 from rolling off of the crank shaft during the pressing operation.

Figure 5:
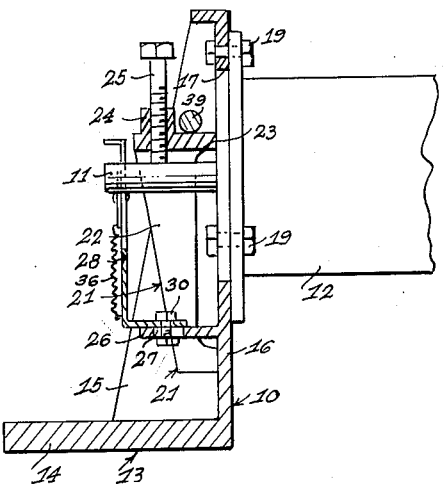
FIGURE 5 is a sectional view taken on the line 5—5 of FIGURE 4.
Figure 6:
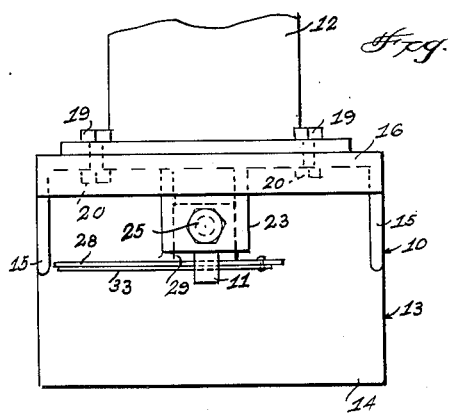
FIGURE 6 is a sectional view taken on the line 6—6 of FIGURE 4.
Figure 7:
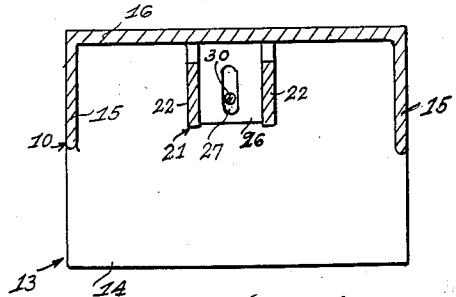
FIGURE 7 is a sectional view taken on the line 7—7 of FIGURE 4.
Figure 8:
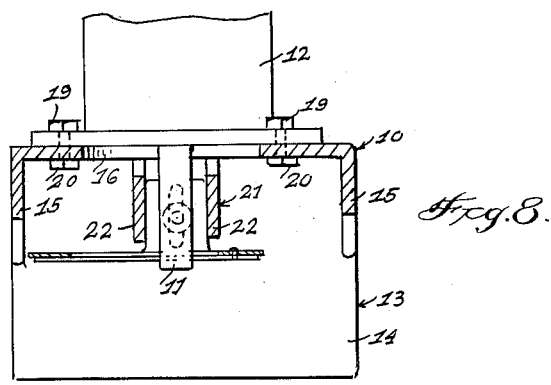
FIGURE 8 is a sectional view taken on the line 8—8 of FIGURE 4.

From the foregoing, it is apparent that there has been provided a machine or apparatus which is especially suitable for use in straightening a shaft such as the crankshaft 11 of an engine such as the engine 12. In use, in the event a shaft such as the shaft 11 has become bent for any reason the engine 12 is arranged as shown in FIGURE 1 for example and the bolts 19 of the engine 12 are extended through the apertures 18 in the wall member 16 and then the nuts 20 are arranged in threaded engagement with the bolts 19 so as to fasten the engine 12 to the wall member 16 of the stand 13. The enlarged openings 17 provide clearance whereby the shaft 11 can extend therethrough, and the shaft 11 extends between the pair of legs 22 and below the crosspiece 23, the shaft 11 being arranged above the indicator 33. By rotating the screw member 25, the screw member 25 can be brought down into engagement with the top portion of the shaft 11, and the indicator 33 will engage the lower surface or opposite surface of the shaft 11. When a given amount of torque is applied to the shaft 11 by the screw member 25, and only at that time, because of the material used, and the manner of operation of the support member 21 as previously described, will the legs 22 of the support member 21 start to flex. At the flexing of the legs 22 the cross piece 23 starts its inward travel and stops only when it engages the engine 12. It is necessary therefore that the ratio of the pressure applied and the pressure exerted be balanced to prevent the engine 12 from bursting open because of the pressure applied by the screw member 25 against the shaft 11. Thus the successful and efficient operation of applicant's invention is possible only because of the exact structure of the support member 21, cross piece 23 and rod 39 as previously described and as shown in FIGURES 4 and 5. The indicator 33 is provided with the pointer 343 for coaction with the scale markings 32, and the indicator 33 is pivotally connected to the plate 28 by means of the pivot pin 35, and the spring member 36 serves to normally urge or bias the indicator 33 in a clockwise direction, FIGURE 1.

The plate 28 is provided with the flange 29 through which extends the bolt 30, and the bolt 30 also extends through the slot 27 in the bar 26 so that by loosening the nut 38 on the lower end of the bolt 30, the plate 28 can be shifted on the bar 26, and after the plate has been positioned at its desired location, the nut 38 is tightened in order to maintain the plate 28 and its associated parts immobile in their adjusted positions.

The parts can be made of any suitable material and in different shapes or sizes.

The purpose of the machine of the present invention is to straighten bent crankshafts without the necessity of removing the crankshaft from the basic engine, on most vertical crankshaft engines, both 2 and 4 cycles. Any engine, adaptable to the machine, can have its crankshafts returned to tolerable limits as follows.

The engine such as the engine 12 is connected to the stand by one or more bolts 19 and the bent shaft 11 of the engine passes below the straightening screw 25, and the dial indicator plate 28 is adjusted so that the dial indicator 33 is positioned at the outer end of the bent shaft 11. The plate 28 is connected to the bar 26 by means of the securing element 30 which extend through the slot 27 so as to permit movement and proper positioning on the bent shaft. The engine crankshaft is turned until the dial indicator shows the maximum high spot of the bent shaft. Pressure is then applied by turning the member 25 until it engages the shaft. The operator continues to apply pressure until the dial moves downward to a reading predetermined by adding the maximum high and maximum low reading, dividing by 2 plus 20 to 25 percent of the average reading. The screw member 25 is then backed off of the shaft 11. The engine crankshaft is then rotated and the amount of out of roundness noted on the scale 32. If the reading is not within predetermined allowances, the process is repeated until the reading is at the correct allowance. When the correct reading is obtained, the engine is removed from the straightening machine and put back into service.

The machine may be drilled in the base and mounted on a repair bench or it may be attached to a pedestal. The machine may be made entirely of metal of a suitable gauge and size depending upon the requirements or conditions under which it is to be used.

The present invention does provide the machine which is especially suitable for straightening crankshafts such as crankshafts of small engines.

Minor changes in shape, size and rearrangement of details coming within the field of invention claimed may be resorted to in actual practice if desired.

What is claimed is:

1. A shaft straightening machine comprising a stand including a vertically disposed wall member and upstanding side portions, said wall member having an opening therein, a support member embodying a pair of vertically disposed legs having their lower ends affixed to said wall member, a crosspiece extending between said legs and said crosspiece having a bushing thereon, an adjustable screw member engaging said bushing, a horizontally disposed guide bar secured to said wall member and said guide bar having a slot therein, a plate having a flange on its lower end adjacent said bar, a securing element extending through said flange and slot, said plate having scale markings thereon, an indicator pivotally connected to said plate for coaction with said scale markings, a spring member connected to said indicator, a shoulder on the upper end of said plate, said wall member having a plurality of spaced apart apertures therein adapted to mount an engine with its shaft perpendicular to the wall and extending through the opening, securing elements extending through the apertures in said wall member for releasably connecting an engine to the stand whereby the shaft of the engine may be extended between the legs of the support member, said screw member and indicator being positioned to engage opposed portions of the shaft of the engine.

2. In a device of the character described, a stand including a vertically disposed wall member and upstanding side portions, said wall member having an enlarged circular opening therein, a support member comprising a vertically disposed pair of legs having their lower ends affixed to said wall member, a crosspiece extending between the upper ends of said legs and said crosspiece having a bushing thereon, an adjustable screw member engaging said bushing, said wall member having a plurality of spaced apart apertures therein adapted to mount an engine with its shaft perpendicular to the wall and extending through the opening, securing elements extending through the apertures in said wall member for releasably connecting an engine to the stand, whereby the shaft of the engine may be extended between the legs of the support member, said screw member and indicator being positioned to engage opposed portions of the shaft to the engine.

References Cited in the file of this patent

UNITED STATES PATENTS

| | | |
|---|---|---|
| 1,308,501 | Littell | July 1, 1919 |
| 1,461,463 | Staley | July 10, 1923 |
| 1,513,641 | Simmons | Oct. 28, 1924 |
| 2,310,151 | Pope | Feb. 2, 1943 |
| 2,426,340 | Bush | Aug. 26, 1947 |